United States Patent [19]

Watanabe

[11] Patent Number: 4,740,937
[45] Date of Patent: Apr. 26, 1988

[54] OPTICAL MAGNETIC INFORMATION RECORDING AND REPRODUCING APPARATUS WITH SEPARATE SUPPORTING MEMBERS FOR SUPPORTING DISC CLAMPER AND MAGNETIC FIELD BIASING DEVICE

[75] Inventor: Seizoo Watanabe, Hachioji, Japan
[73] Assignee: Olympus Optical Company, Limited, Tokyo, Japan
[21] Appl. No.: 814,676
[22] Filed: Dec. 30, 1985
[30] Foreign Application Priority Data
Dec. 30, 1984 [JP] Japan .................... 59-280854
[51] Int. Cl.⁴ ............. G11B 13/04; G11B 17/022
[52] U.S. Cl. .................... 369/13; 369/270; 369/271; 360/99
[58] Field of Search .............. 369/13, 270, 271, 261; 360/97, 99, 114; 346/137

[56] References Cited
U.S. PATENT DOCUMENTS 3,436,082  4/1969  Bostrom et al. ................ 369/270
4,063,286 12/1977  Takahara et al. ............... 369/270
4,472,748  9/1984  Kato et al. ..................... 360/114
4,498,161  2/1985  Eisemann ....................... 369/270
4,581,667  4/1986  Gerfast ........................... 360/97
4,587,586  5/1986  Hamanaka ...................... 360/97
4,610,009  9/1986  Connell ......................... 360/114

*Primary Examiner*—Raymond F. Cardillo
*Assistant Examiner*—Hoa T. Nguyen
*Attorney, Agent, or Firm*—Bruce L. Adams; Van C. Wilks

[57] ABSTRACT

In an optical magnetic recording and reproducing apparatus including a disc clamp member and a magnetic field biasing device, the disc clamp member and the magnetic field biasing device are pivotably supported by separate supporting members so as to undergo pivotal movement independently of one another with respect to a disc cartridge holder. This enables a compact arrangement in which the disc cartridge holder is compactly accommodated beneath the disc clamp member and the magnetic field biasing device during the loading of a record disc.

14 Claims, 5 Drawing Sheets

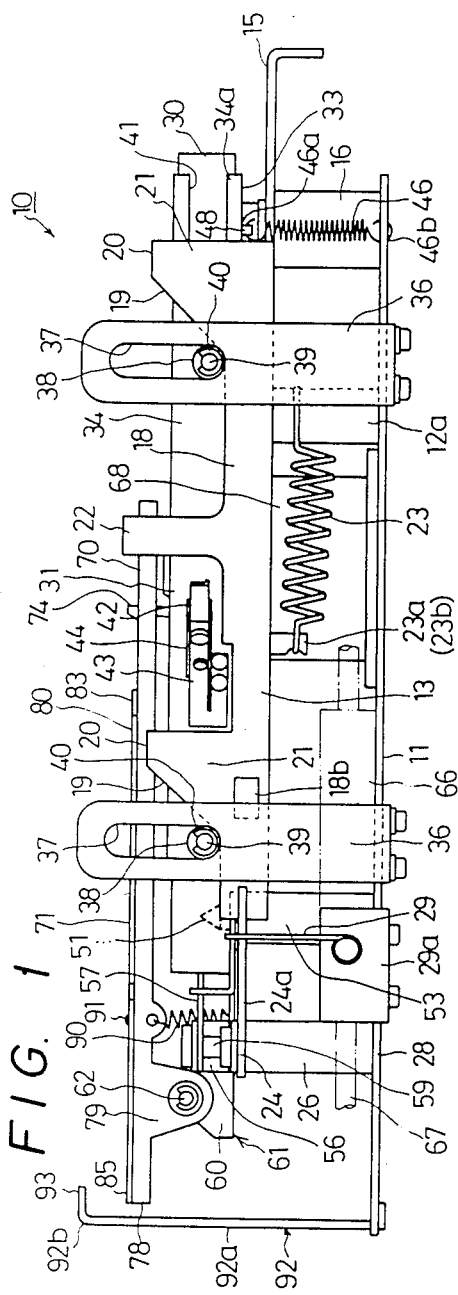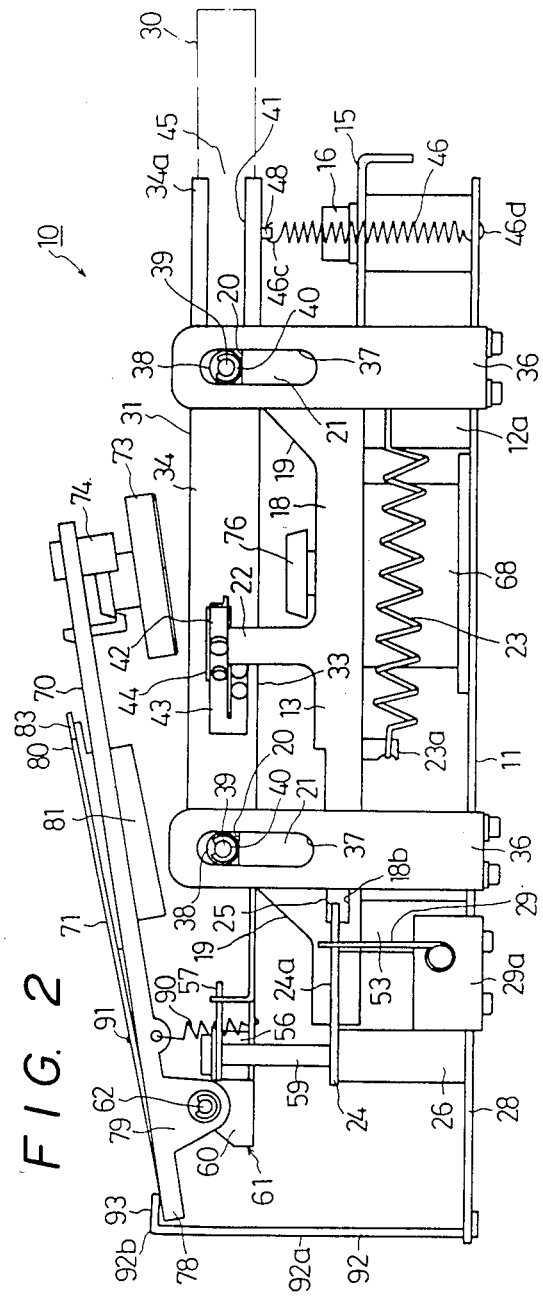

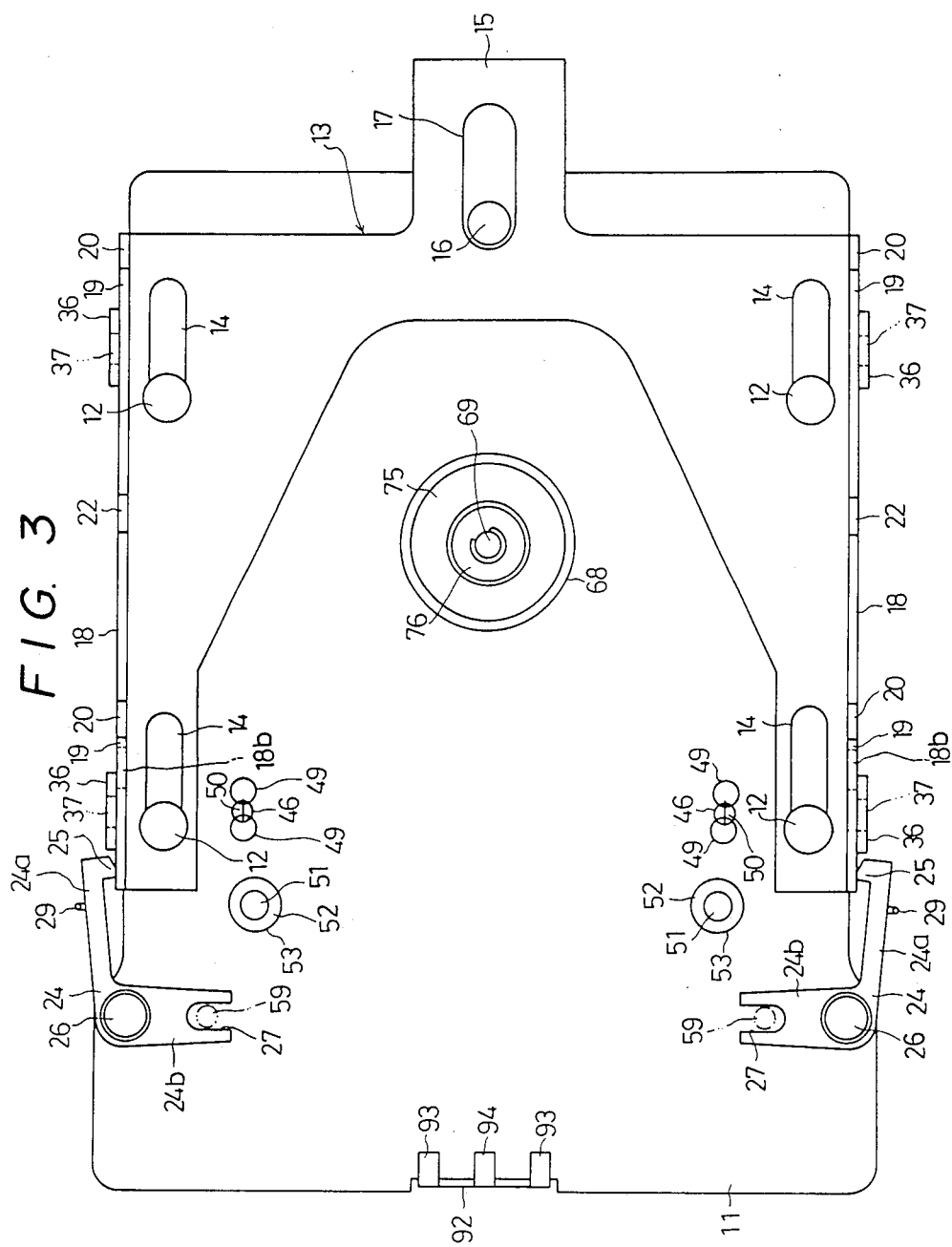

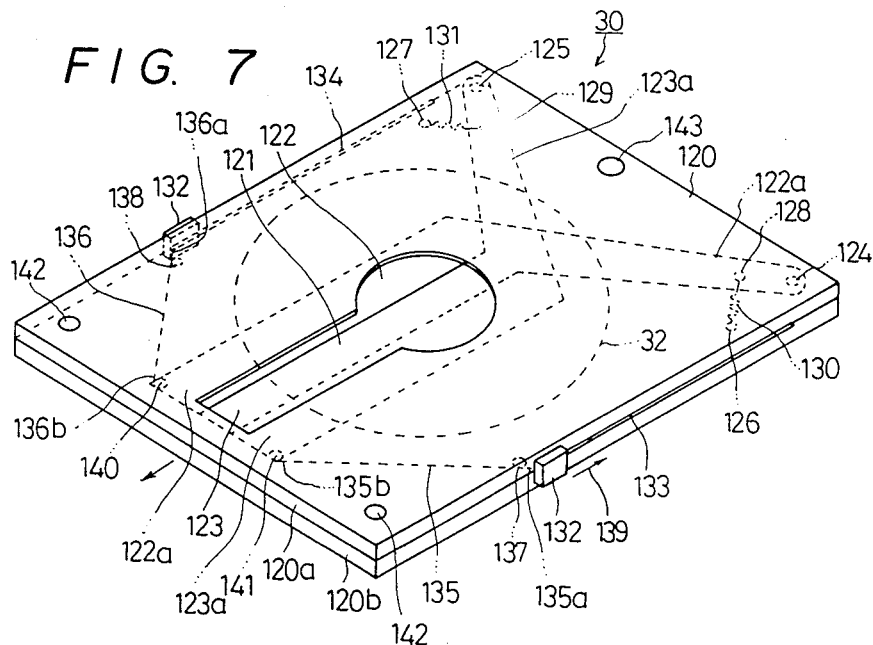
FIG. 7
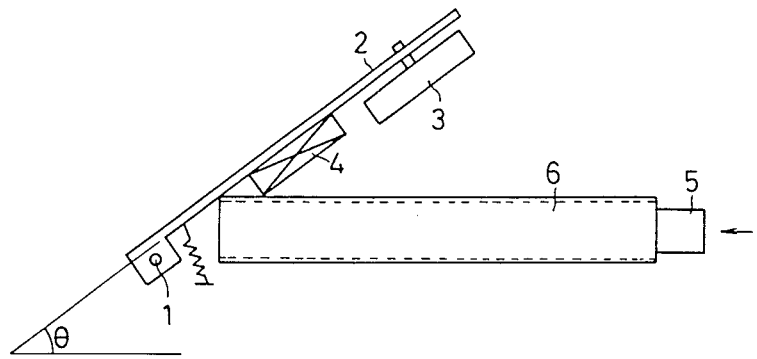
PRIOR ART FIG. 8(a)
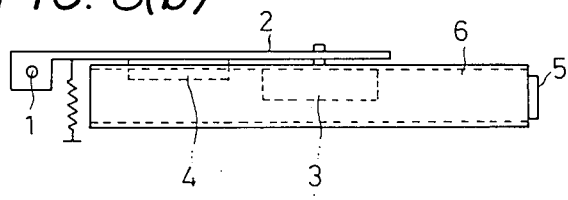
PRIOR ART FIG. 8(b)

OPTICAL MAGNETIC INFORMATION RECORDING AND REPRODUCING APPARATUS WITH SEPARATE SUPPORTING MEMBERS FOR SUPPORTING DISC CLAMPER AND MAGNETIC FIELD BIASING DEVICE

BACKGROUND OF THE INVENTION

The present invention relates to an optical magnetic recording and reproducing apparatus and more particularly to a mounting apparatus for mounting a recording medium e.g. a cartridge containing a photo magnetic disc.

DESCRIPTION OF THE PRIOR ART

In photo magnetic disc apparatus, it is necessary to magnetically bias the photo magnetic disc by applying magnetic field to the laser spot portion of the disc to record or to erase the information to or from the disc. Thus, it is necessary to mount a magnetic field biasing device.

FIGS. 8(a) and 8(b) show the prior art. As shown, a disc clamp mounting plate 2 which is pivotably supported by a pivot shaft 1 mounts a disc clamp member 3 and a magnetic field biasing device 4. When a disc cartridge 5 is inserted in a cartridge holder 6, the disc clamp mounting plate 2 must be rotated at an open angle $\theta$, as shown in FIG. 8(a), and does not contact with the cartridge 5 and the holder 6 which holds the disc cartridge 5 therein. On the disc clamp mounting plate 2, the magnetic field biasing device 4 is mounted separately from the disc clamp member 3. The mounting position of the device 4 is normally adjacent to the pivot shaft 1 of the disc clamp mounting plate 2 so that the open angle $\theta$ of the mounting plate 2 must be sufficiently large to clear the magnetic field biasing device 4 from the disc cartridge 6. Consequently, the disc clamp member 3 which is mounted on the foremost position of the disc clamp mounting plate 2 is moved to a high position during the open movement. The overall height of the photo magnetic disc apparatus is very high and the apparatus is large.

The object of the present invention is to mitigate the above mentioned disadvantage and to provide an improved optical recording medium mounting apparatus in which the height of the disc clamp member and the magnetic field biasing device at the open position during insertion and remove of the disc cartridge is kept low so that the overall height of the apparatus is low and a compact apparatus is obtained.

SUMMARY OF THE INVENTION

Briefly stated, the optical recording medium mounting apparatus according to the invention includes a disc clamp member and a magnetic field biasing device which are pivotably supported by a pair of separate mounting members so that the disc clamp member and the magnetic field biasing device are separately moved relative to each other. Thus each of the disc clamp member and the magnetic field biasing device can be independently moved upwards to a minimum height to allow insertion and removal of the disc cartridge.

BRIEF DESCRIPTION OF THE DRAWING

FIGS. 1-7 are illustration of the mounting apparatus of optical recording medium according to the present invention, in which, FIG. 1 is a side view of the apparatus when a disc cartridge is fitted in the apparatus;

FIG. 2 is a side view of the apparatus when a disc cartridge is inserted or removed;

FIG. 3 is a plan view of the eject plate of the apparatus shown in FIG. 1;

FIG. 4 is a plan view of the apparatus shown in FIG. 1;

FIG. 5(a) is a perspective view to show spring mounting between the base plate and the cartridge holder of the apparatus shown in FIG. 1;

FIG. 5(b) is a plan view of the structure shown in FIG. 5(a);

FIG. 6 is an enlarged partial sectional crew showing a cramp of a photo magnetic disc;

FIG. 7 is a perspective view of a disc cartridge; and

FIGS. 8(a) and 8(b) are illustrations of the prior art.

DESCRIPTION OF PREPARED EMBODIMENT

Figure 4:
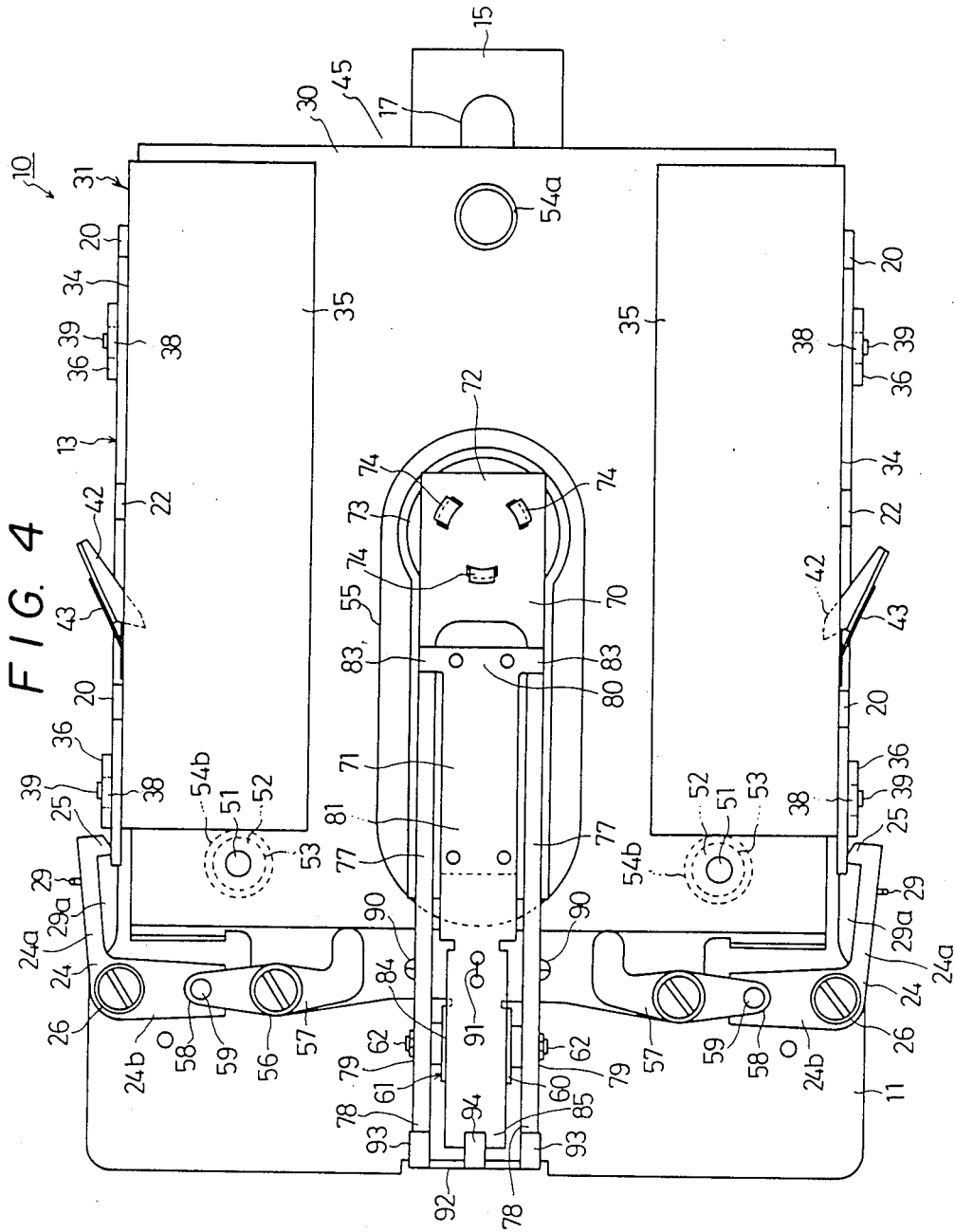

The optical recording medium mounting apparatus will be described in detail in conjunction with FIGS. 1-7.

As shown in FIGS. 1-3, the optical recording medium mounting apparatus 10 comprises a base plate 11 on which an eject plate 13 is supported through a plurality of eject guides 12 to be movable forwardly and rearwardly relative to the base plate 11.

The eject guide plate 13 has guide slots 14 for the eject guide 12 in both side portions of the plate 13 as shown in FIG. 3, and an eject knob 15 projected from the front center portion of the plate 13. The eject knob 15 has a guide slot 17 to receive a cartridge support 16 which is mounted on the base plate 11.

The opposite side portions of the eject plate 13 extend vertically to form vertical side frames 18. Each side frame 18 forms front and rear upward projections 21. Each projection 21 has a horizontal shoulder portion 20 and a rearwardly sloping cam surface 19 which is adjacent to the horizontal shoulder portion 20. Also the middle portion of the side frame 18 forms an upwardly projected actuation member 22. On the opposite sides of the bottom surface of the eject plate 13, engage pins 23a and 23b project downwardly and springs 23 are engaged between the pins 23a and 23b and the eject guides 12a and 12b which are front left and right eject guides 12, to urge the eject plate 13 forwardly with respect to the base plate 11, i.e. rightwardly as shown in FIG. 1. The rear end portion of each side frame 18 of the eject plate 13 forms a lock opening 18b which is engageable with a powl 25 which is formed on a end of an arm 24a of a L-shaped eject plate lock lever 24. Thus, when the eject plate 13 is pushed rearwards, i.e. leftwards as shown in FIG. 2 against the spring 23, the powl 25 engages in the lock opening 18b, as shown in FIG. 2, and the eject plate 13 maintains operative position against the force of the spring 23.

The L shaped eject plate lock levers 24 are pivotably supported by support members 25 which are mounted on the opposite sides of the rear portion of the base plate 11. Each lock lever 24 has another arm 24b which has a recess 27. On opposite side edges of the rear portion of the base plate 11, spring mount plates 29a are secured. A spring 29 which is secured to each spring mount plate 29a urges the arm 24a of the eject plate lock lever 24 so that the pawl 25 is normally urged against the side frame 18 of the eject plate 13.

Thus, the eject plate 13 is supported on the base plate 11 movably in forward and rearward directions relative to the base plate. Further on the eject plate 13, a cartridge holder 31 is mounted to slideably receive a disc cartridge 30.

The cartridge holder 31 is integrally formed with a base plate 33, side plates 34 and a bent portion 35.

On both side edges 28 of the base plate 11, front and rear guide plates 36 are vertically mounted. The upper portion of each guide plate 36 froms a guide slot 37. On both side plates 34 of the cartridge holder 31 at the front and rear portion thereof, roller shaft 39 is secured. On each roller shaft 39, a roller 38 is rotatably supported and engages with each guide slot 37 of the guide plate 36. Thus, the cartridge holder 31 is vertically movably supported through the guide plates 36 relative to the base plate 11. Each roller 38 of the cartridge holder 31 moves along the guide slot 37 of the guide plate 36 and also contacts with each cam surface 19 of the front and rear projections 21 of the eject plate 13 which is supported on the base plate 11. Each roller 38 is held on the shaft 39 by a clip 40.

Each of the side plates 34 of the cartridge holder 31 has a lock groove 41 at the front end 34a, and also mounts on the middle portion an elastic member 43 having a claw member 42 which locks the cartridge 30 in the cartridge holder 31. A window 44 is formed on the side plate 34 to allow insertion of the claw member 42 into the holder 31 to engage with the cartridge 30. The front side of the cartridge holder 31 is open to form an opening 45 which allows insertion and eject of the disc cartridge 30.

Figure 5:
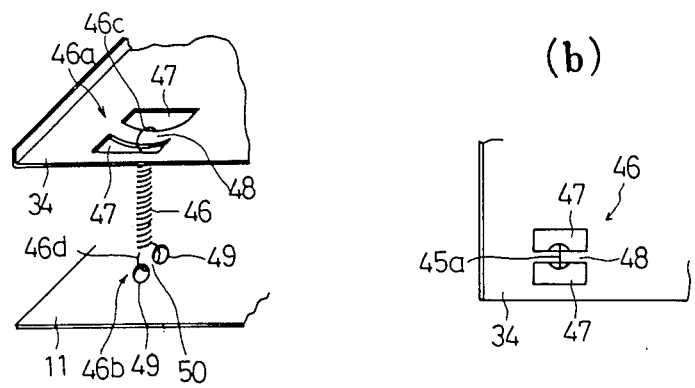

The front and rear portions of both sides of the base plate 33 of the cartridge holder 31 are engaged with four tension springs 46 which engage with corresponding portions of the base plate 11 to urge the cartridge holdr 31 downwards against the base plate 11 as shown in FIG. 1. The engage portions 46a and 46b of the tension spring 46 are shown in FIG. 5. As shown, between two rectangular openings 47 formed in the base plate 33 of the cartridge holder 31, a downwardly projected bridge portion 48 is formed to engage with the engage portion 46a of the spring 46. Two round openings 49 are formed in the base plate 11 to form a bridge portion 50 which is engaged with the other engage portion 46b of the spring 46. The engage portions 46a and 46b form hooks 46c and 46d which engage with the bridge 48 of the cartridge holder 31 and the bridge 50 of the base plate 11 respectively.

Further the base plate 33 of the cartridge holder 31, as shown FIG. 4, at the front center portion thereof, is provided with a through hole 54a to receive therein the cartridge support 16 which is supported on the base plate 11. The rear portion of the base plate 33 is provided with through holes 54b each receiving a conical pin 51 of a stepped portion 52 of a cartridge guide 53 which is mounted on the base plate 11. In the center portion of the base plate 33, an elongated opening 55 is formed to receive a disc clamper and a magnetic field biasing device. The magnetic field biasing device may be a single or a combined device of e.g. yoke, magnet and/or coil.

The left and right portions of the rear end of the base plate 33 of the cartridge holder 31 mount L-shaped cartridge push levers 57 rotatable about shafts 56. One end 58 of each lever 57 mounts a connecting pin 59 which engages with the recess 27 formed in the arm 24b of the eject plate lock lever 24.

A disk clamp mounting plate 70 is shown in FIGS. 1, 2, 4 and 6 and mounts a clamp member 73 through a support member 74 at the front end 70 thereof. The mounting plate 70 has two legs 77 which extend rearwards as shown in FIG. 4. The rear end 78 of each legs 77 has a downward projection 79 which is pivotably supported by a pivot pin 62 at an upward projection 61 which is formed at the rear end of the middle portion of the base plate 33 of the cartridge holder 31.

The upward projections 61 are formed at the rear end of the middle portion of the base plate 33 by bending both sides upward to form generally U-shaped bent portion 60, and the pivot pin 62 passes through the both projected plates.

A magnetic field biasing device mounting plate 71 is formed by a member different from the disc clamp mounting plate 70, and is pivotably supported between the legs 77 of the disc clamp mounting plate 70. More particularly, the magnet field biasing device mounting plate 71 mounts on the front portion 80 thereof a magnetic field biasing device 81 and, at both sides of the front portion 80, the mounting plate 70 is provided with projections 83 which rest on the left and right legs 77 of the disc clamp mounting plate 70. The rear portion of the magnetic field biasing device mounting plate 71 is provided with ears 84 which is pivotably supported by the same pivot pin 62 which pivotably supports the downwards projections 79 of the disc clamp mounting plate 70.

Thus, the disc clamp mounting plate 70 and the magnetic field biasing device mounting plate 71 are pivotably supported by the same pivot pin 62. Near the ears 79 and 84, the mounting plates 70 and 71 mount tension coil springs 90 and 91, which are connected at the other end to the rear portions of the base plate 33 of the cartridge holder 31 to urge the mounting plates 70, 71 clockwise to operative position shown in FIG. 1. The magnetic field biasing device mounting plate 71 is urged by the tension coil spring 91, however, the projections 83 come in contrast with the both legs 77 of the disc clamp mounting plate 70 to restrict further movement.

When the cartridge holder 31 moves upwards, rear ends 78 and 85 of the disc clamp mounting plate 70 and the magnetic field biasing device mounting plate 71 engage with engage pawls 93 and 94 which are formed on a free end portion of an actuation plate 92. As shown in FIGS. 1–4, the actuation plate 92 has a plate body 92a projecting upwards from the base plate 11 and three equidistant pawls 93 and 94 extending at right angle from the top end 92b of the body 92a. According to the invention, the positions of the pawls 93 and 94 are independently determined to limit the pivotably elevated positions of the disc clamp member 73 and the magnetic field biasing device 81 to respective minimum heights to clear from the disc cartridge 30 as shown in FIG. 2.

FIG. 7 shows the disc cartridge 30. As shown, a cartridge body 120 formed by an upper cartridge portion 120a and a lower cartridge portion 120b which are integrally secured with each other. In the cartridge body 120, the upper cartridge portion 120a is provided with an insert opening 121 for receiving the disc clamp member 73 and the magnetic field biasing device 81, and the lower cartridge portion 120b is provided with an insert opening 121 for receiving the turn table 75 and a recording and reproducing head (not shown).

A pair of shutter blades 122 and 123 are pivotably supported by pins 124 and 125 which are mounted in both sides of the rear portion of the cartridge body 120. Tension springs 130 and 131 are engaged between pins 128 and 129 which are mounted in the cartridge body 120 and the shutter blades 122 and 123 respectively to urge the shutter blades 122 and 23 to closed position.

The both side edges of the cartridge body 120 is provided with slide grooves 133 and 134 in which, hooks 132 are slidably inserted. One ends 135a and 136b of wires 135 and 136 are connected to the hooks 132, and the other ends 135b and 136b are connected with pins 140 and 141 which are mounted on front end portions 122a and 123a of the shutter blades 122 and 123 through guide rollers 137 and 138 which are rotatably supported in the front portions of the left and right side edges of the cartridge body 120. When the hooks 132 slide along the slide grooves 133 and 134 in the direction of arrow 139 shown in FIG. 7, the shutter blades 122 and 123 move to open position by rotating about the pins 124 and 125. When the disc cartridge 30 is inserted into the cartridge holder 31 to be set in the mounting apparatus 10, the hooks 132 engage with the slide grooves 41 on both sides of the cartridge holder 31, and the hooks 132 are retained by the end of the slide grooves 41 so that further insertion of the cartridge 30 causes relative movement between the hooks and the cartridge body to open the shutter blades 122 and 123. When the disc cartridge 30 is inserted fully in the cartridge holder 31, the pawls 42 on the side plates 34 of the cartridge holder 31 engage with the slide grooves 133 and 134 to lock the disc cartridge 30 in the cartridge holder 31. The cartridge body 120 has through holes 142 in both side portions for positioning purpose and an engaging hole 143 to receive the cartridge support 16.

As shown in FIGS. 1 and 2, the apparatus 10 has a pick up table 66 on the base plate 11, a guide shaft 67 of the pick up table 66 which traverses on the base plate 11, and a motor 68 which drives the photo magnetic disc 32 in the disc cartridge 30 by the clamp member 73 mounted on the disc clamp mounting plate 70 and a disc support 75 mounted on a rotating shaft 69 driven by the motor 68. The disc 32 is clamped between the clamp member 73 and the disc support 75. The drive shaft (not shown) of the motor 68 is connected with the rotating shaft 69 for the photo magnetic disc 32.

Figure 6:
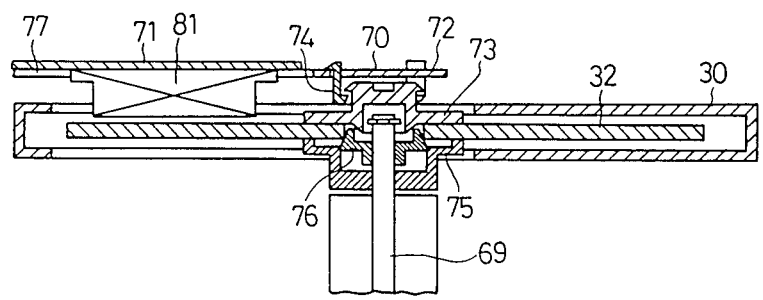

A disc guide 76 is mounted on the disc support 75 to align the disc 32 as shown in FIG. 6.

To insert and fit the disc cartridge 30 into the mounting apparatus 10 of above mentioned construction, at first the apparatus 10 is set in open position as shown in FIG. 2.

In the open position shown in FIG. 2, the eject plate 13 is pushed rearwards against the spring 23 so that the eject plate 13 is guided by the guides 12 mounted on the base plate 11 and by the cartridge support 16 to move rearwards and the lock holes 18b on both side frames 18 of the eject plate 13 is locked by the pawls 25 of the eject plate lock lever 24. Thus the eject plate 13 is locked in the position as shown in FIG. 2.

When the eject plate 13 moves rearwards, the cam surfaces 19 on the projections 21 of both side frames 18 of the eject plate 13 engage with the rollers 38 of the cartridge holder 31. Thus, as the cam surfaces 19 moves rearward in FIG. 1, the rollers 38 moves upwards along the guide slots 37 of the guide plates 36 mounted on the base plate 11.

When the rollers 38 move upwards, the cartridge holder 31 also moves upwards against the tension springs 46 which urge the cartridge holder downwards. When the rollers reach the horizontal shoulder portions 20 adjacent the cam surfaces 19 and to the uppermost position in the guide slots 37 of the guide plates 36, the cartridge holder 31 is supported by the horizontal portion 20 of the eject plate 13 in the open position for receiving or ejecting the disc cartridge 30.

Further, when the eject plate 13 moves rearwards relative to the base plate 11, the actuation members 22 on both side frames 18 push the pawls 42 on the elastic members 43 on both sides of the cartridge holder 31 outwards from the engage windows 44 to release the cartridge 30 in the holder 31. Also, when the cartridge holder 31 moves upwards, the disc clamp mounting plate 70 and the magnetic field biasing device mounting plate 71 which are pivotably supported by the pivot shaft 62 at the rear end portion of the cartridge holder 31 are engaged at the rear ends 78 and 85 with the pawls 93 and 94 of the actuating plate 92 which are mounted on the base plate 11. Thus the mounting plates 70 and 71 rotates counter clockwise as shown in FIG. 2 against the tension springs 90 and 91 and keeps the inoperative position as shown in FIG. 2.

In the inoperative position shown in FIG. 2, a desired disc cartridge 30 is inserted in the cartridge holder 31 through the inlet opening 45 as shown by chain line in FIG. 2.

When the front end of the disc cartridge 30 which is inserted in the cartridge holder 31 pushes the cartridge push levers 57 at the rear end of the cartridge holder 31 to pivot the levers 57 which causes rotation of the eject plate lock levers 24 through the pins 59 of the levers 57 and the recesses 27 of the levers 24. Thus, the lock pawls 25 of the eject plate lock levers 24 are released from the lock openings 18b of the eject plate 13.

When the lock pawl 25 of the eject plate lock lever 24 is released from each lock opening 18b of the left and right side frames 18, the eject plate 13 moves forward by the spring 23. When the eject plate 13 moves forwards, the horizontal portions 20 of the projections 21 leave from the rollers 38 so that the cartridge holder 31 moves downwards by the tension springs 46 and the rollers 38 descend along the guide slots 37 of the guide plates 36 and the cam surfaces 19 of the side plates 18 of the eject plate 13 until the rollers 38 reach lowermost end of the guide slots 37 as shown in FIG. 1.

As the cartridge holder 31 descends, the disc cartridge 30 also descends until the positioning holes 142 of the disc cartridge 30 engage with the pins 51 of the cartridge guides 53 which are mounted on the base plate 11, and the cartridge support 16 supports lower surface of the cartridge. Thus the cartridge 30 is positioned accurately by the height and plane position.

As the eject plate 13 moves forwards, the actuation members 22 of the both side frames 18 leave from the pawls 42 disposed on the elastic members 43 mounted on both sides of the cartridge holder 31 so that pawls 42 engages with the slide grooves 133 and 134 through the engage windows 44 of the cartridge holder 31 so that the disc cartridge 30 is retained in the cartridge holder 31.

When the disc cartridge 30 is inserted in the cartridge holder 31, the hooks 132 sliding in the guide grooves 133 and 134 of the cartridge 30 engage in the grooves 41 on both sides of the cartridge holder 31. The hooks 132 stop at the end of the grooves 133 and 134 so that relative movement between the hooks 132 and the cartridge 30 causes pulling of the wires 135 and 136 by the hooks 132 so that both shutter blades 122 and 123 rotate about the pins 124 and 125 against the coil springs 130 and 131 to open the opening 120 of the cartridge body 121.

When the cartridge holder 31 moves downwards, the disc clamp mounting plate 70 and the magnetic field biasing device mounting plate 71 both of which have been engaged with the engaging pawls 93 and 94 of the actuation plate 92 of the base plate 11 are released from the pawls 93 and 94 and rotates clockwise from the position shown in FIG. 2 to the position shown in FIG. 1 by the tension springs 90 and 91. The disc clamp member 73 and the magnetic field biasing device 81 on the mounting plates 70 and 71 are inserted into the opening 121 of the disc cartridge 30. The photo magnetic disc 32 in the disc cartridge 30 is aligned and clamped as shown in FIG. 6 by the disc clamp member 73 and the turn table 75 and the disc guide 76 on the rotatable shaft 69 with leaving a predetermined clearance from the inner surfaces of the upper cartridge portion 120a and the lower cartridge portion 120b of the disc cartridge 30.

The engage elements 83 of the magnetic field biasing device mounting plate 71 contact with the both legs 77 of the disc clamp mounting plate 70 so that the magnetic field biasing device 81 is positioned above the photo magnetic disc 32 with a predetermined clearance betwen the lower surface of the device 81 and the upper surface of the disc 32. Thus, the photo magnetic disc 32 in the disc cartridge 30 is mounted in the operating position.

After desired operations e.g. writing, recording, reproducing or erasing, the disc cartridge 30 may be removed from the apparatus. To take out the disc cartridge 30, only necessary operation is to push the knob 15 of the eject plate 13 rearwards into the base plate 11 against the force of the spring 23. The cartridge holder 31 moves upwards and the above mentioned movements of the parts release the disc cartridge 30 and finally the eject plate 13 is locked. The final position is shown in FIG. 2. The hooks 132 on both sides of the disc cartridge 30 are released from the grooves 41 of the cartridge holder 31 so that the shutter blades 122 and 123 in the cartridge 30 are automatically return to the closed position by the springs 130 and 131. The disc cartridge 30 stops at a position in which the disc cartridge 30 is projected halfway from the cartridge holder 31.

It will be appreciated that the disc clamp member and the magnetic field biasing device are pivotably supported by separate support members according to the present inventions. Consequently, the disc clamp member and the magnetic field biasing device can be limitted to necessary minimum height position, so that overall height of the apparatus is low and compact photo magnetic disc apparatus is obtained.

What is claimed is:

1. In an optical-magnetic recording and reproducing apparatus including a disc clamp member and a magnetic field biasing device, the improvement comprising a pair of separately pivotable supporting members for pivotably supporting said disc clamp member and said magnetic field biasing device, respectively, the one supporting member which supports the disc clamp member including means for supporting thereon the other supporting member which supports the magnetic field biasing device when the disc clamp member and the magnetic field biasing device are moved to operative positions of the apparatus.

2. In an optical-magnetic recording and reproducing apparatus for use with a photo-magnetic record disc: a base; a holder mounted on the base for removably and rotatably holding a photo-magnetic record disc when the same is loaded in a predetermined position on the apparatus; clamping means operative when moved to a working position for releasably clamping the loaded record disc; magnetic biasing means operative when moved to a working position for applying a magnetic biasing field to the loaded record disc; and supporting means supporting the clamping means and the magnetic biasing means for pivotal movement independently of one another to and from their respective working positions during loading and unloading of the record disc such that the extent of pivotal movement of one of the clamping means and magnetic biasing means is larger than that of the other of the clamping means and magnetic biasing means.

3. An apparatus according to claim 2; wherein the supporting means comprises a pair of separate support members extending over the holder and aligned with each other in a radial direction of the loaded record disc, the pair of support members being pivotably movable relative to the holder around one of their end portions and supporting the clamping means and the magnetic biasing means respectively at their other end portions to thereby position the clamping means and the magnetic biasing means separately from each other in spaced relation to the holder during loading and unloading of the record disc.

4. An apparatus according to claim 3; wherein the holder comprises a cartridge holder for removably receiving therein a disc cartridge accommodating therein a photo-magnetic record disc.

5. An apparatus according to claim 4; wherein the cartridge holder includes a front opening for insertion of the disc cartridge, and a shaft disposed at a rear end portion of the cartridge holder for pivotably supporting the pair of supporting members.

6. An apparatus according to claim 5; including elevating means disposed between the base and the cartridge holder for elevating the cartridge holder relative to the base during the loading and unloading of the disc cartridge.

7. An apparatus according to claim 6; including actuating means mounted on the base and cooperative with the elevating means when the elevating means elevates the pair of support members together with the cartridge holder for acting on the one end of each of the support members to thereby pivot the support members upwardly from the cartridge holder so that the clamping means and the magnetic biasing means are displaced from the cartridge holder.

8. An apparatus according to claim 6; wherein the elevating means comprises sliding means slideably movable in a rearward direction relative to the cartridge holder along the base, and converting means for mechanically converting the rearward sliding movement of the sliding means to elevating movement of the cartridge holder.

9. An apparatus according to claim 8; wherein the converting means comprises a linear cam provided on the sliding means and slanting rearwardly, a roller shaft integral with the cartridge holder and rollably supported along the linear cam, and a guide plate having a vertical guide opening for receiving therein the roller shaft to guide the roller shaft in the vertical direction.

10. An apparatus according to claim 9; including urging means disposed between the sliding means and the base for forwardly urging the sliding means relative to the base, and locking means for locking the sliding means when the sliding means moves to the rearmost position against the urging means.

11. An apparatus according to claim 10; including release means at the rear inside of the cartridge holder and actuatable when the disc cartridge is fully inserted into the cartridge holder to come in engagement with the release means for acting on the locking means to release the same so that the sliding means automatically returns to its rest position upon completion of the loading of the record disc to thereby allow the cartridge holder to descend and, at the same time, the actuating means reversely acts on the pair of support members in response to the descending movement of the support members together with the cartridge holder to pivot the support members downwardly relative to the cartridge holder.

12. An apparatus according to claim 7; wherein the actuating means includes means defining the extent of pivotal movement of the respective support members.

13. An apparatus according to claim 12; wherein the defining means includes means defining a larger extent of pivotal movement of the support member supporting the magnetic biasing means than that of the other support member supporting the clamping means.

14. An apparatus according to claim 3; wherein the one support member supporting the clamping means includes means for supporting thereon the other support member after the one support member pivots downwardly far enough to position the clamping means on top of the loaded record disc.

* * * * *